US010049456B2

(12) United States Patent
Banerjee et al.

(10) Patent No.: US 10,049,456 B2
(45) Date of Patent: Aug. 14, 2018

(54) VERIFICATION OF BUSINESS PROCESSES USING SPATIO-TEMPORAL DATA

(71) Applicant: International Business Machines Corporation, Armonk, NY (US)

(72) Inventors: Nilanjan Banerjee, Kolkata (IN); Subhrajit Bhattacharya, Bangalore (IN); Umamaheswari C. Devi, Bangalore (IN); Raghavendra Singh, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 15/227,663

(22) Filed: Aug. 3, 2016

(65) Prior Publication Data

US 2018/0040128 A1 Feb. 8, 2018

(51) Int. Cl.
*G06K 9/00* (2006.01)
*G06T 7/00* (2017.01)
*G06Q 10/06* (2012.01)

(52) U.S. Cl.
CPC ....... *G06T 7/0042* (2013.01); *G06Q 10/0639* (2013.01); *G06T 2207/10004* (2013.01)

(58) Field of Classification Search
CPC . G06T 2207/10016; G06T 2207/30232; G06T 7/20; G06T 7/0016; G06T 7/55; G06K 2209/40; G06K 9/00624; G08B 13/19613; G08B 13/19608
See application file for complete search history.

(56) References Cited

U.S. PATENT DOCUMENTS

| RE38,401 E | * | 1/2004 | Goldberg | G06F 17/30274 |
| | | | | 715/720 |
| 8,325,036 B1 | | 12/2012 | Fuhr et al. | |
| 8,354,926 B2 | | 1/2013 | Donovan et al. | |
| 8,594,482 B2 | | 11/2013 | Fan et al. | |
| 2005/0096790 A1 | * | 5/2005 | Tamura | G06N 3/008 |
| | | | | 700/245 |
| 2008/0018738 A1 | | 1/2008 | Lipton et al. | |
| 2008/0074496 A1 | | 3/2008 | Venetianer et al. | |
| 2008/0192115 A1 | | 8/2008 | Gindele et al. | |
| 2009/0181640 A1 | * | 7/2009 | Jones | G08B 13/196 |
| | | | | 455/404.2 |
| 2012/0026308 A1 | * | 2/2012 | Johnson | G06K 9/00369 |
| | | | | 348/77 |
| 2013/0182904 A1 | | 7/2013 | Zhang et al. | |

(Continued)

*Primary Examiner* — Li Liu
(74) *Attorney, Agent, or Firm* — Ference & Associates LLC

(57) ABSTRACT

One embodiment provides a method of identifying a location of a target object within a plurality of images, the method including: utilizing at least one processor to execute computer code that performs the steps of: receiving a plurality of images; receiving position information indicating a central location, wherein the central location comprises a location that the plurality of images were taken; receiving direction information indicating a position of a target object with respect to the central location, wherein one of the plurality of images contains the target object; and determining, using the position information and the direction information, a target location, wherein the target location comprises a location of the target object. Other aspects are described and claimed.

20 Claims, 7 Drawing Sheets

(56) References Cited

U.S. PATENT DOCUMENTS

| | | | |
|---|---|---|---|
| 2014/0211002 A1* | 7/2014 | Lin | H04N 7/181 348/143 |
| 2015/0355102 A1* | 12/2015 | Kido | G01N 21/8851 348/46 |
| 2016/0255282 A1* | 9/2016 | Bostick | H04N 5/23238 348/39 |
| 2016/0304198 A1* | 10/2016 | Jourdan | B64C 39/024 |

* cited by examiner

VERIFICATION OF BUSINESS PROCESSES USING SPATIO-TEMPORAL DATA

BACKGROUND

Many companies and enterprises use business process monitoring methods to verify that business processes are being implemented as intended. The business process monitoring method chosen by the company is generally dependent on the type and size of business process that is being implemented. For example, in a manufacturing plant, the company may implement random product verification to ensure that the product is being manufactured within tolerances. Companies utilizing computer programs may have software which monitors operations and processes to ensure they are being performed correctly. Another method of business process monitoring is using video surveillance to ensure that workers are performing their job duties per the appropriate procedure.

BRIEF SUMMARY

In summary, one aspect of the invention provides a method of identifying a location of a target object within a plurality of images, the method comprising: utilizing at least one processor to execute computer code that performs the steps of: receiving a plurality of images; receiving position information indicating a central location, wherein the central location comprises a location that the plurality of images were taken; receiving direction information indicating a position of a target object with respect to the central location, wherein one of the plurality of images contains the target object; and determining, using the position information and the direction information, a target location, wherein the target location comprises a location of the target object.

Another aspect of the invention provides an apparatus for identifying a location of a target object within a plurality of images, the apparatus comprising: at least one processor; and a computer readable storage medium having computer readable program code embodied therewith and executable by the at least one processor, the computer readable program code comprising: computer readable program code that receives a plurality of images; computer readable program code that receives position information indicating a central location, wherein the central location comprises a location that the plurality of images were taken; computer readable program code that receives direction information indicating a position of a target object with respect to the central location, wherein one of the plurality of images contains the target object; and computer readable program code that determines, using the position information and the direction information, a target location, wherein the target location comprises a location of the target object.

A further aspect of the invention provides a computer program product for identifying a location of a target object within a plurality of images, the computer program product comprising: a computer readable storage medium having computer readable program code embodied therewith, the computer readable program code comprising: computer readable program code that receives a plurality of images; computer readable program code that receives position information indicating a central location, wherein the central location comprises a location that the plurality of images were taken; computer readable program code that receives direction information indicating a position of a target object with respect to the central location, wherein one of the plurality of images contains the target object; and computer readable program code that determines, using the position information and the direction information, a target location, wherein the target location comprises a location of the target object.

An additional aspect of the invention provides a method of identifying a location of a target object within a plurality of images, the method comprising: utilizing at least one processor to execute computer code that performs the steps of: receiving a plurality of images; receiving position information indicating a central location, wherein the central location comprises a location that the plurality of images were taken; receiving direction information indicating a position of a target object with respect to the central location, wherein one of the plurality of images contains the target object; determining, using the position information and the direction information, a target location, wherein the target location comprises a location of the target object; obtaining time information, wherein the time information indicates a time that each of the plurality of images was taken; comparing the target location and time information, for each of the plurality of images, to a predefined process; identifying a discrepancy between the target location and time information of at least one of the plurality of images and the predefined process; and notifying a user of the discrepancy.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
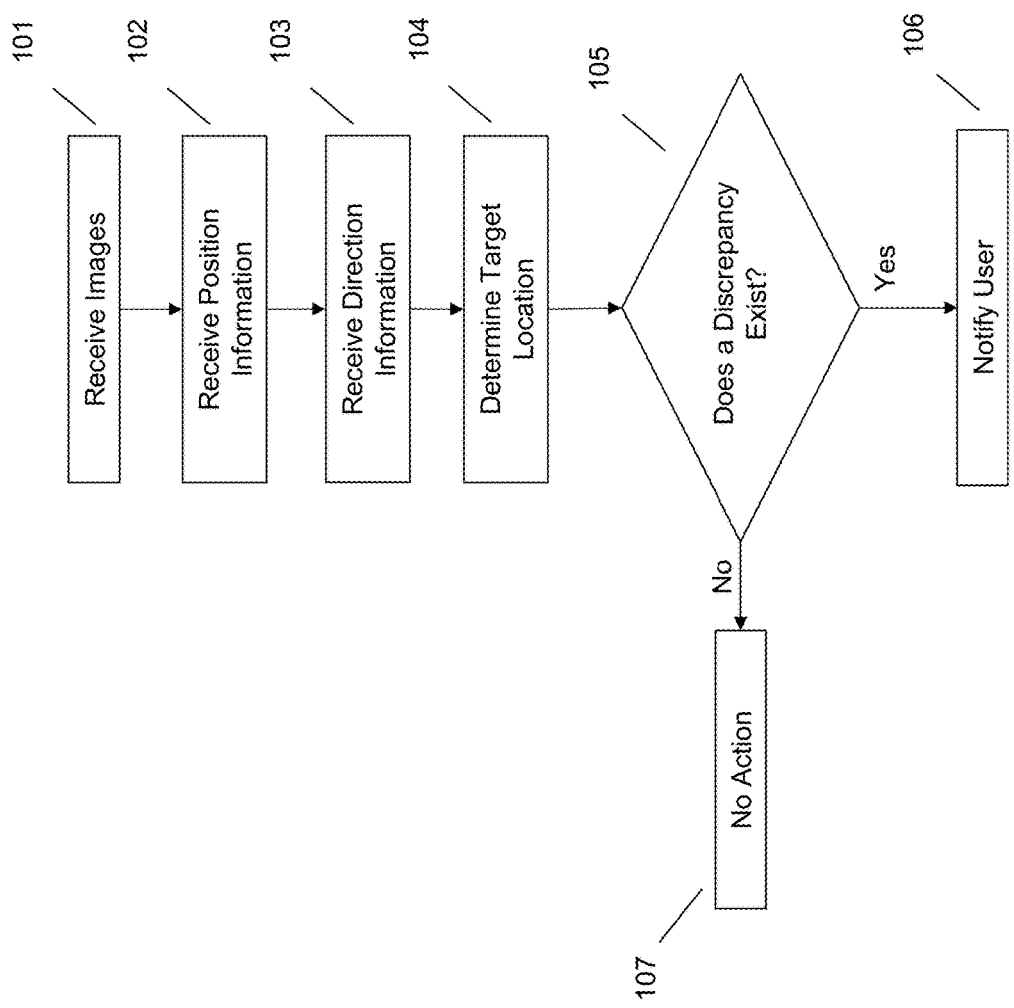
FIG. 1 illustrates a method of identification of an object location.
Figure 2:
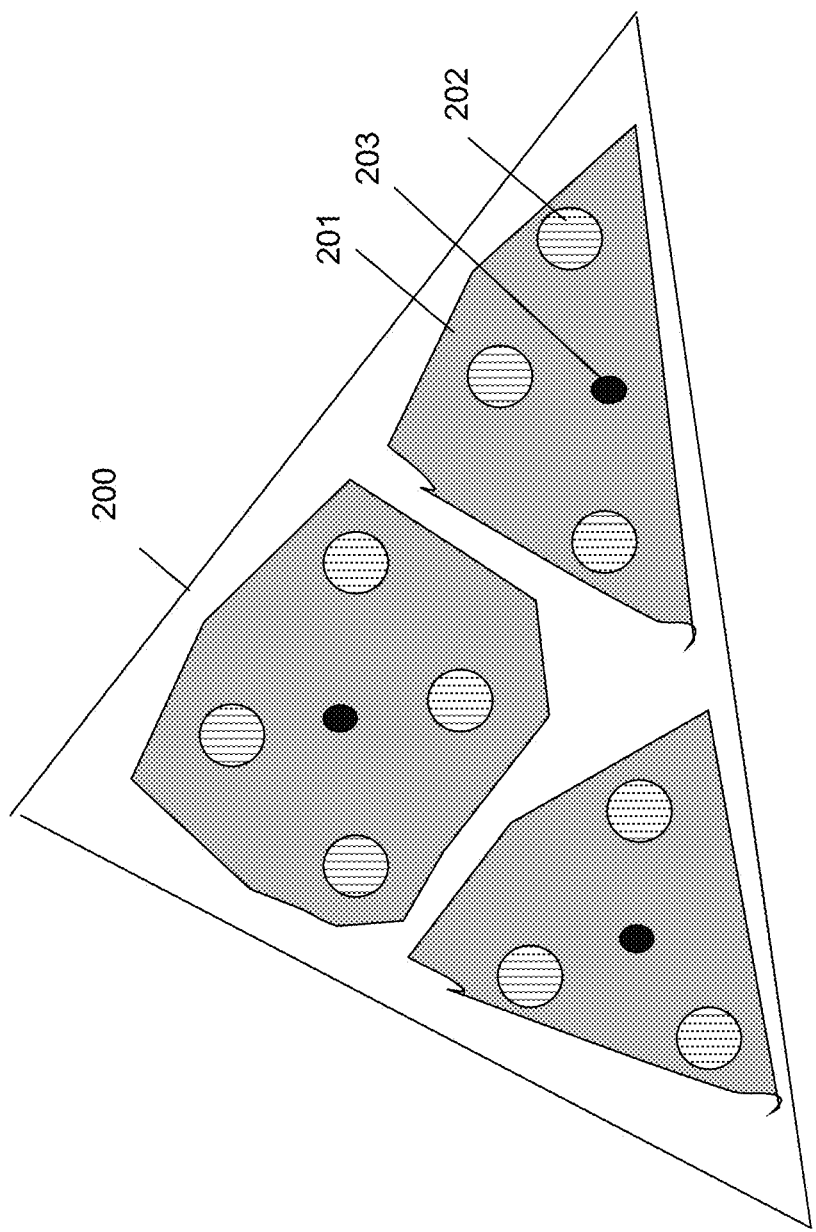
FIG. 2 illustrates an example object location layout.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-6 can be performed or utilized by way of a processing unit or units and system memory such as those indicated, respectively, at 16' and 28' in FIG. 7, whether on a server computer, a client computer, a node computer in a distributed network, or any combination thereof.

Some businesses and enterprises implement business process monitoring using video surveillance. For example, a store may use video surveillance to ensure that cashiers are performing their job duties correctly. In these cases, the use of a stationary video surveillance system using a video recording device is practical because the video recording device is always pointed towards a single location and the worker does not have access to turn the video recording device off and on. However, in situations where the worker has access to the video recording system, the worker may turn the device off and perform an unauthorized action and then turn the device back on to continue recording. The time lapse in the recording, created by turning the device off and on, may not be noticed by companies reviewing the footage. One reason may be that the device may not record time stamps that correlate to a global clock.

Another use of video surveillance requires a worker to take images, for example, with an image capture device (e.g., still camera), of work while it progresses. For example, a worker may be performing a job having four distinct tasks associated with the job. The worker may be required to take images of the work after each task is completed. However, this type of surveillance may be susceptible to deception by the worker. For example, the worker may have to perform the same tasks on multiple objects. Rather than completing all the tasks for each object, the worker may complete only one task on an object and take images after the task is done. The worker may then complete a different task for a different object and take images. Upon finishing the four tasks on four different objects, each object only having one task completed for it, the worker may use the images and say that all four tasks were completed for each of the objects. Alternatively, a worker may complete all four tasks for a single object but use the same images to say that the tasks were completed on more than one object.

Accordingly, an embodiment provides a method of ensuring that business processes have not been violated by determining a location of a target object within a plurality of images. In determining a location of a target object, an embodiment uses information regarding a center point which indicates the location where the images were taken from. To ensure that each object is a different object, the center point may be previously designated. Images for multiple objects are then taken at this center point. An embodiment also receives direction information which indicates where a target object is with respect to the center point. Using the center point location and the direction information, an embodiment can identify the location of the object, which allows an embodiment to identify whether the object in the images is a unique object as compared to the objects in other images. According to different embodiments, different methods may be used to determine the location of the object. Some methods may give more exact object location information than others. The method used to determine the location of the object may be dependent on the business scenario and the information needed to verify the business process. More details regarding the different methods and complexity of these methods can be found discussed below, for example, in connection with FIGS. 4, 5, and 6.

An embodiment can verify, using the location information of the object, whether the business process was followed as defined by the processes and procedures. One embodiment additionally receives time information associated with when the image was taken. One embodiment may use the time information to assist in verifying the business process was followed as required, for example by verifying the time information is unique for each image. As another example, using the time information, one embodiment can identify if a time gap exists between images and whether the time gap exceeds a predetermined threshold. If an embodiment detects a discrepancy between the information within the images and the predefined business process, an embodiment can notify a user who can then take appropriate action.

Using these methods, a company can implement a business process monitoring method that allows use of an image capture device. The use of an image capture device in a situation where a video recording device is normally used may result in reduced processing requirements, thereby reducing the cost associated with the image capturing. Additionally, providing an authentication method of an image using determined object locations provides reassurance to a company that procedures are being followed when use of an image capture device by a worker may be one of the only methods for monitoring business processes. While an example of verifying business processes on a large farm or plantation will be used throughout this disclosure, the embodiments as described herein can be utilized in other applications and systems, for example, verifying business processes for a process requiring incremental task verification.

Referring now to FIG. 1, at 101 an embodiment may receive a plurality of images. Receiving may include retrieving the images from a location. For example, a user may manually upload the images to a storage location accessible by an embodiment and the system may access the images from that storage location. If the image capture device is operatively coupled to an embodiment, for example, through a wired or wireless communication method, an embodiment may access the image capture device (e.g., smart phone, still camera, tablet, etc.) and retrieve the images. Receiving may also include obtaining the images from a source. As an example, a user may upload the images to the system and designate to the system which images should be analyzed. In other words, the receipt of the images may be an active or passive action by an embodiment.

The images may include images of objects or tasks as they are completed. For example, if a worker is performing an incremental task that requires images after each task is completed, the images may include the objects as each task is completed. As a working example, a worker on a tree plantation may need to complete tasks associated with each tree. The tasks may include clearing the land under the tree, spreading fertilizer around the tree, and applying water to the tree. The established business process may include taking images of the tree before any tasks are completed and also taking pictures after each task on a tree is completed, resulting in a total of four images.

At 102, an embodiment may receive position information indicating a central location where the images were taken. For example, referring to FIG. 2, a plantation sector 200 is split into smaller zones 201. Each of the zones 201 has a particular number of trees 202. The zones 201 may be designated by the business process and may be smaller or larger than shown in the example. Each of the zones 201 includes a designated central location 203, which has been designated as the location where the images should be captured. The central location 203 is identified as a location that allows the worker to take images of all the trees 202 within the zone 201. The central location 203 may be designated by the business process and may, therefore, be a location known to an embodiment.

Alternatively, the image capture device may include a global positioning system (GPS) device which allows an embodiment to identify where the images were captured. Using a GPS-enabled device would not allow an embodiment to identify the location of each object within the image, because the images have to be taken from a distance from the object making the GPS information inaccurate for determining the actual location of the object. Other methods of determining the location where the images were taken are possible and contemplated, for example, the worker may record the location information which may be manually or automatically uploaded for use by an embodiment. As with receiving the images at 101, receiving the position information may be a passive or active receipt.

An embodiment may, at 103, receive direction information. The receipt of the direction information may be a passive or active receipt, for example, similar to the receipt of the images at 101 and/or the receipt of the position information at 102. The image capture device may include a means for capturing the direction information, for example, the image capture device may include a compass which gives an indication of the direction that the image capture device is pointed when the image is obtained. As another example, the worker may manually record the direction as each image is obtained. The direction information may indicate a position of an object with respect to the central location. This object may be considered a target object by an embodiment, because this is the object that an embodiment is trying to identify the location of. The target object may be the object contained within the image that is currently being analyzed.

Figure 3:
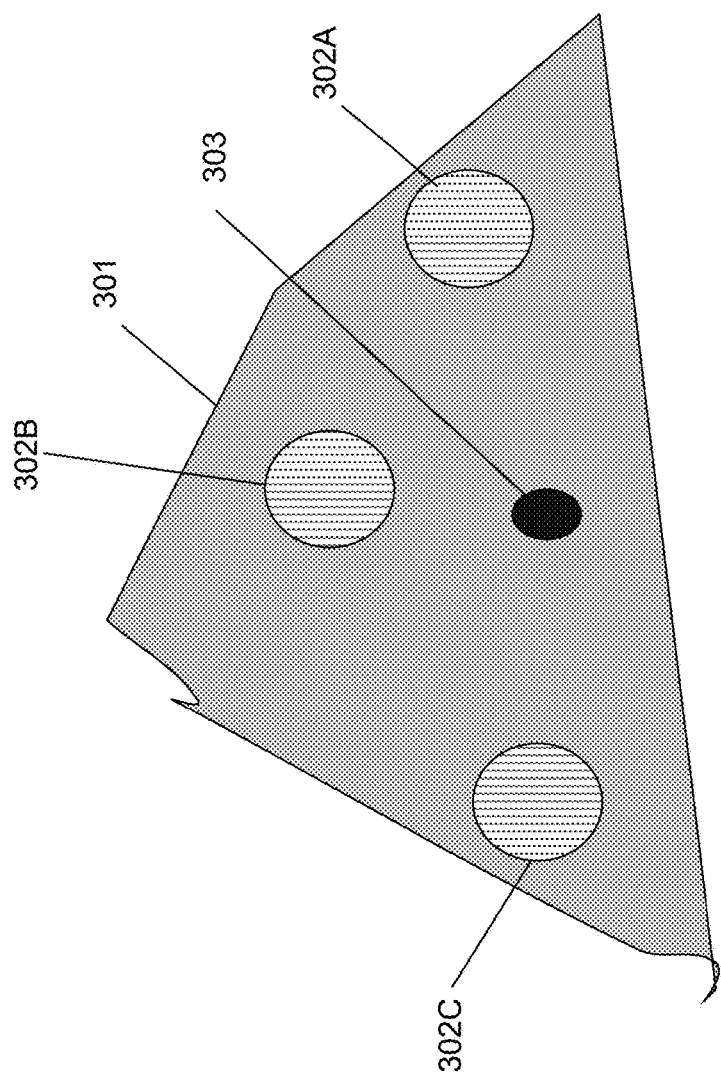
FIG. 3 illustrates another example object location layout.

For example, referring to FIG. 3, if a worker captures an image of one of the three trees (302A, 302B, and 302C) in zone 301 from location 303, the target object may be the tree, for example 302A, that is contained within the image. The direction information of the object, for example tree 302A, may be expressed in a variety of ways. For example, the direction information may indicate that tree 302A is to the right of central location 303. In other words, the direction information may be general. Alternatively, the direction information may indicate an angle, for example, 12° from a baseline angle. Other methods of designating a direction are possible, for example, as an offset from a cardinal compass direction.

Using the position information and direction information, an embodiment may determine a target location at 104. The target location may indicate a location of the target object. With just the position information and direction information, an embodiment may not be able to identify an exact location of the object. For example, using only position and direction information, an embodiment likely will be unable to calculate the grid or coordinate location of the object. In other words, the target location may not indicate an exact location of the target object, but may rather indicate a relative location of the target object with respect to the central location.

Figure 4:
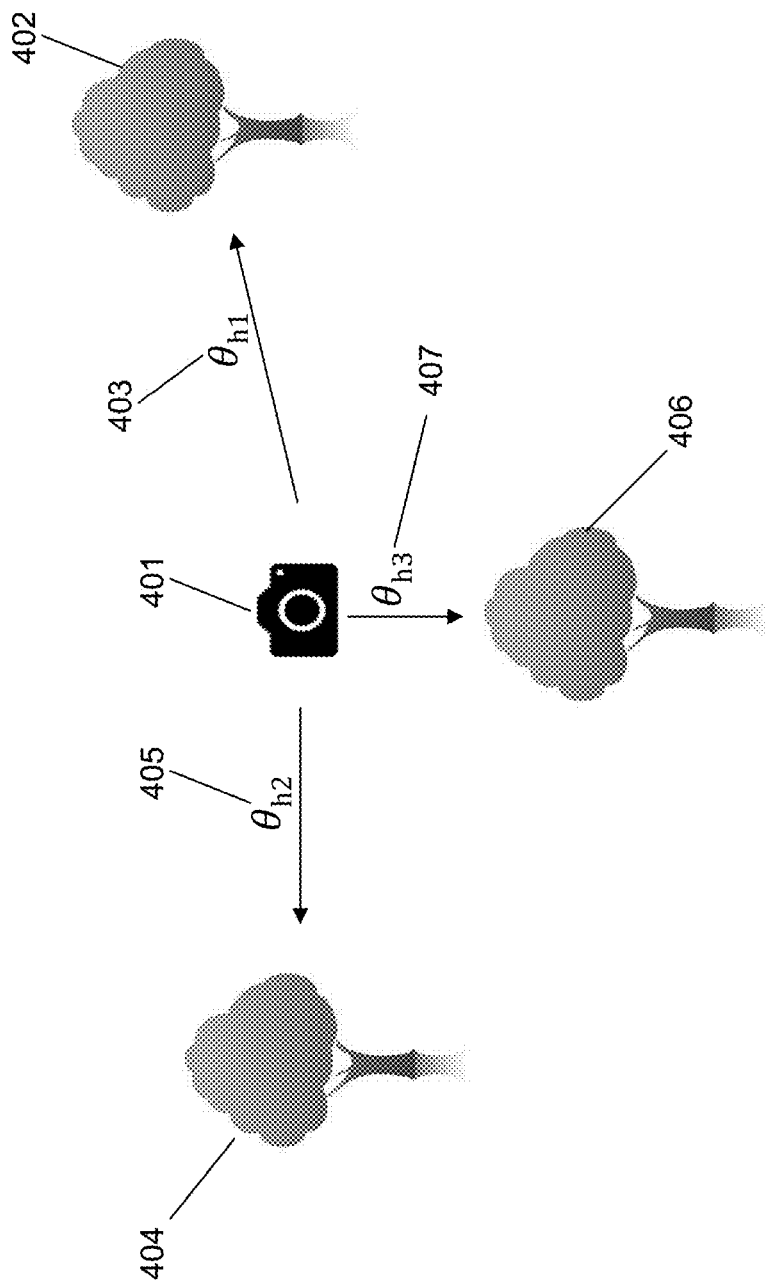
FIG. 4 illustrates an example object location technique in a two dimensional space.

As an example, referring to FIG. 4, an embodiment may receive position information 401 for the central location where the images are taken from. When the worker is standing at the central location 401 and taking an image of target object 402, the direction information 403 (represented as $\theta_{h1}$ in the example) will be different from the direction information 405 (represented as $\theta_{h2}$ in the example) for target object 404 and also different from the direction information 407 (represented as $\theta_{h3}$ in the example) for target object 406. Therefore, each of these positions can be identified as unique locations using only the direction and position information. Thus, it is clear that if the worker always takes images precisely from the central location designated by an embodiment, then the direction information given by the horizontal angle can be used to uniquely identify the location of the target object in a two dimensional space. It should be noted that in practice, the worker may not always be at the precise central location specified, so some embodiments may be built with allowances or tolerances to account for differences in specified locations and measured locations.

One method of determining a more exact target location is by obtaining position information and direction information of a single target object from two different central locations. As an example, referring to FIG. 5, an embodiment may receive position information for a first central location 501 and may additionally receive position information for a second central location 502. For each of these positions, 501 and 502, an embodiment may additionally receive direction information 503 (represented as $\theta_{h1}$ in the example) and 504 (represented as $\theta_{h2}$ in the example) for each position (501 and 502).

Figure 5:
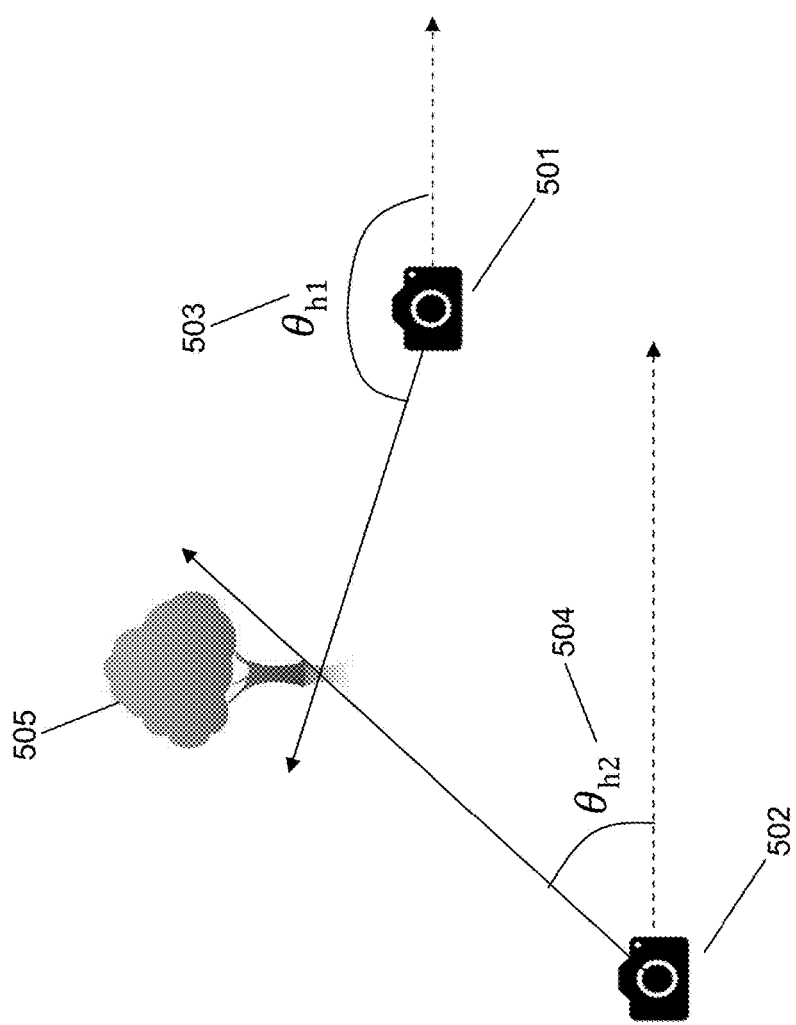
FIG. 5 illustrates another example object location technique in a two dimensional space.

The direction information may be identified using a similar reference entity for the determination of the direction, specifically, a vector pointing in a given direction from the central location. For example, the reference for the calculation of the direction angles in FIG. 5 is similar (i.e., a vector pointing to the right of the central location 501 and 502). If the direction information is calculated using different reference entities, the calculation of the location of the target object may be inaccurate. Using this information, an embodiment can calculate the exact location of a target object 505. In other words, if images of a single target object 505 are captured from two different designated central locations (501 and 502) and direction information (503 and 504) is additionally captured for the target object 505 from the two different central locations (501 and 502), an embodiment can determine the exact location of the target object 505, for example, as coordinates, vectors, and the like. This type of determination also identifies the location of the target object in a two dimensional space.

Figure 6:
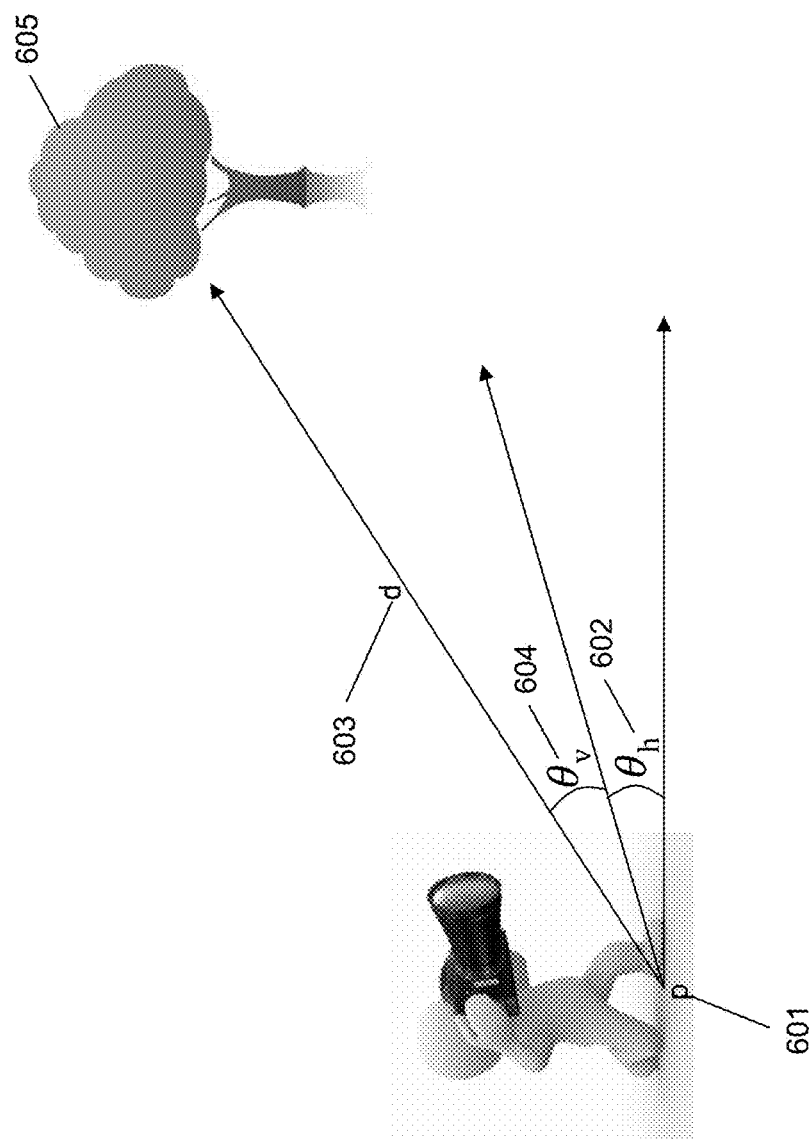
FIG. 6 illustrates an example object location in technique in a three dimensional space.

With additional information an embodiment can make a more specific location determination. As an example, referring to FIG. 6, an embodiment may receive position information 601 (represented as p in the example) and direction information 602 (represented as $\theta_h$ in the example), as described above. In the example of FIG. 6, the direction information is captured as an angle. In one embodiment additional information which may be obtained may include distance information 603 (represented by d in the example), which may indicate how far the target object 605 is from the central location. The distance information 603 could be captured using a laser device or other measurement device either manually or automatically, for example, as part of the image capture device.

An embodiment may additionally receive height information 604 (represented by $\theta_v$ in example) that indicates the height of the target object 605 with respect to the central location 601. This height information 604 may indicate the angle at which the image capture device is located to capture the object. For example, the angle may be measured from an imaginary line parallel to the ground. As can be understood, this information does not necessarily designate exactly how tall the target object 605 is, but rather how far the image capture device needs to be angled to capture the target object 605. For example, the height information 604 may be captured from an inclination sensor on the image capture device. Using the position 601, direction 602, distance 603, and height 604 information, an embodiment can identify the exact location of the target object 605, for example, in a three dimensional space.

One embodiment may additionally obtain time information indicating when the image was taken. The time information may be included in the image file or may be obtained from a secondary source. One embodiment may use the time information to group images to assist in identifying the location information. For example, an embodiment may group all images taken within a certain time together. The time frame may indicate that a worker took the images while in a single zone. An embodiment may use the time information to sort the images. For example, the images may be placed in sequential or incremental order based upon the time information. One embodiment may use the time information to verify the business process. For example, per the business process, the task should take a specified amount of time. An embodiment may then compare the time information and the determined target location to a predefined process, for example, the business process procedure that the worker is performing. If the time information does not correlate to the amount of time the task should have taken, it may detect this as a discrepancy.

The time information may also be used by the system for other purposes. As an example, using the time information, an embodiment may compare the time information between two consecutive images to a predetermined threshold. If the time information between the images exceeds the threshold, it may indicate that a time gap exists between the images. Upon detection of a time gap, an embodiment may notify a user. A time gap may indicate that some type of fraudulent activity happened between the capturing of the two images. For example, a worker may have deleted an image or turned off the image capture device. Analysis of a time gap may allow an image capture device to replace a video capture device, reducing processing and costs associated with the video stream. Alternatively, identifying that the time gap has exceeded a predetermined threshold may be used to improve process efficiencies. For example, if a worker must manually take images and it is found that the time gap between the images exceeds a predetermined threshold, the system may alert a user. The user may then use the information to find a more efficient way for the worker to perform the process.

At 105, an embodiment may identify if a discrepancy exists between the determined target location and a predefined business process. For example, one embodiment may compare the target location with a predetermined location. The predetermined location may include a location in which the target object is expected. In other words, the system may have a known layout of the objects. Using the determined target location, the system can compare the target location with the known object location and determine whether the target location matches the known object location. The system can then determine whether a discrepancy exists between the known object location and the determined target location. Identifying a discrepancy would indicate that the images may not be of the correct object, which may indicate that the worker is attempting to violate the business process.

If no discrepancy is identified at 105, an embodiment may take no additional action at 107. However, if a discrepancy is identified at 105, an embodiment may notify the user at 106. The notification may include any type of notification. For example, it may include a visual notification, audible notification, haptic notification, or any other type of notification method. The notification may be generic and indicate that a discrepancy was found. Alternatively, the notification may be detailed and indicate what the discrepancy was and how it was found. Thus, an embodiment provides a method for validating that business processes are being followed as desired.

Figure 7:
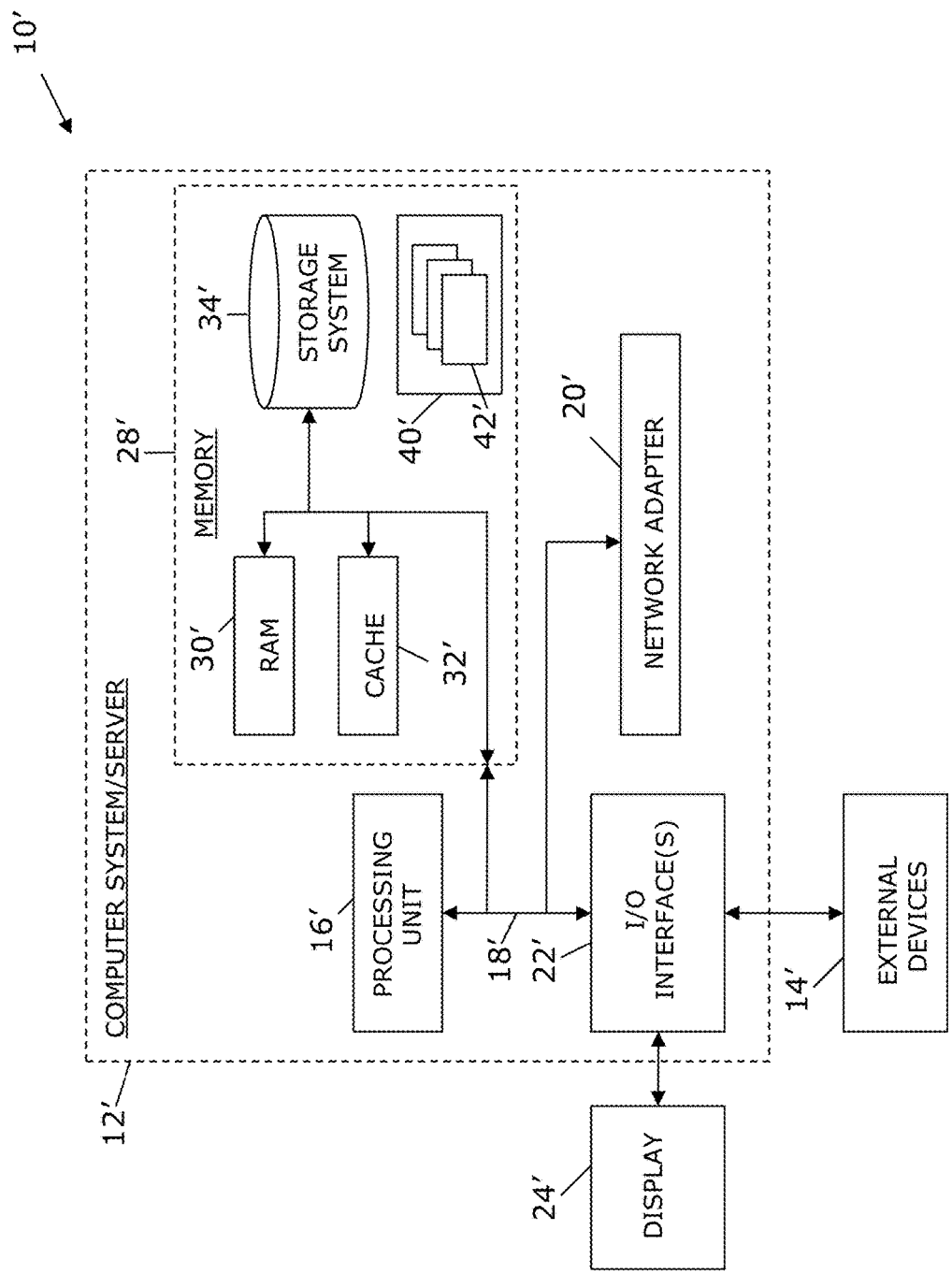
FIG. 7 illustrates a computer system.

As shown in FIG. 7, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of identifying a location of a target object within a plurality of images, the method comprising:
   utilizing at least one processor to execute computer code that performs the steps of:
   receiving a plurality of images, wherein each of the plurality of images comprise an image of a target object at different time frames;
   receiving position information indicating a central location, wherein the central location comprises a designated location where the plurality of images were taken;
   receiving direction information, for each of the plurality of images, indicating a position of a target object with respect to the central location corresponding to each of the plurality of images;
   determining, using the position information and the direction information, a target location corresponding to a location of the target object with respect to the central location within each of the plurality of images; and
   identifying if the target location of the target object as determined using the position information and direction information corresponds to an expected location of the target object.

2. The method of claim 1, wherein the identifying comprises comparing the determined target location to a predetermined location, wherein the predetermined location comprises the expected location where the target object is expected.

3. The method of claim 2, further comprising identifying a discrepancy between the determined target location and predetermined location.

4. The method of claim 1, further comprising obtaining time information, wherein the time information indicates a time that each of the plurality of images was taken.

5. The method of claim 4, further comprising comparing the time information between two consecutive images of the plurality of images to a predetermined threshold.

6. The method of claim 5, further comprising notifying a user if the time information between two consecutive images exceeds the predetermined threshold.

7. The method of claim 4, further comprising comparing the target location and time information, for each of the plurality of images, to a predefined process.

8. The method of claim 7, further comprising identifying a discrepancy between the target location and time information of at least one of the plurality of images and the predefined process.

9. The method of claim 1, wherein the determining comprises identifying the location of the target object in a two dimensional space.

10. The method of claim 1, further comprising receiving distance information, wherein the distance information indicates how far the target object is from the central location.

11. The method of claim 10, further comprising receiving angle information, wherein the angle information indicates a height of the target object with respect to the central location.

12. The method of claim 11, wherein the determining comprises identifying the location of the target object in a three dimensional space.

13. An apparatus for identifying a location of a target object within a plurality of images, the apparatus comprising:
    at least one processor; and
    a computer readable storage medium having computer readable program code embodied therewith and executable by the at least one processor, the computer readable program code comprising:

computer readable program code that receives a plurality of images, wherein each of the plurality of images comprise an image of a target object at different time frames;

computer readable program code that receives position information indicating a central location, wherein the central location comprises a designated location where the plurality of images were taken;

computer readable program code that receives direction information, for each of the plurality of images, indicating a position of a target object with respect to the central location corresponding to each of the plurality of images;

computer readable program code that determines, using the position information and the direction information, a target location corresponding to a location of the target object with respect to the central location within each of the plurality of images; and identifying if the target location of the target object as determined using the position information and direction information corresponds to an expected location of the target object.

14. A computer program product for identifying a location of a target object within a plurality of images, the computer program product comprising:

a computer readable storage medium having computer readable program code embodied therewith, the computer readable program code comprising:

computer readable program code that receives a plurality of images, wherein each of the plurality of images comprise an image of a target object at different time frames;

computer readable program code that receives position information indicating a central location, wherein the central location comprises a designated location where the plurality of images were taken;

computer readable program code that receives direction information, for each of the plurality of images, indicating a position of a target object with respect to the central location corresponding to each of the plurality of images;

computer readable program code that determines, using the position information and the direction information, a target location corresponding to a location of the target object with respect to the central location within each of the plurality of images; and identifying if the target location of the target object as determined using the position information and direction information corresponds to an expected location of the target object.

15. The computer program product of claim 14, further comprising computer readable program code that compares the determined target location to a predetermined location, wherein the predetermined location comprises a location where the target object is expected; and computer readable program code that identifies a discrepancy between the determined target location and predetermined location.

16. The computer program product of claim 14, further comprising computer readable program code that obtains time information, wherein the time information indicates a time that each of the plurality of images was taken.

17. The computer program product of claim 16, further comprising computer readable program code that compares the time information between two consecutive images of the plurality of images to a predetermined threshold; and computer readable program code that notifies a user if the time information between two consecutive images exceeds the predetermined threshold.

18. The computer program product of claim 16, further comprising computer readable program code that compares the target location and time information, for each of the plurality of images, to a predefined process.

19. The computer program product of claim 18, further comprising computer readable program code that identifies a discrepancy between the target location and time information of at least one of the plurality of images and the predefined process.

20. A method of identifying a location of a target object within a plurality of images, the method comprising:

utilizing at least one processor to execute computer code that performs the steps of:

receiving a plurality of images, wherein each of the plurality of images comprise an image of a target object at different time frames;

receiving position information indicating a central location, wherein the central location comprises a designated location where the plurality of images were taken;

receiving direction information, for each of the plurality of images, indicating a position of a target object with respect to the central location corresponding to each of the plurality of images;

determining, using the position information and the direction information, a target location corresponding to a location of the target object with respect to the central location within each of the plurality of images; and obtaining time information, wherein the time information indicates a time that each of the plurality of images was taken;

comparing the target location and time information, for each of the plurality of images, to a predefined process;

identifying a discrepancy between the target location and time information of at least one of the plurality of images and the predefined process, wherein the identifying a discrepancy comprises identifying if the target location of the target object as determined using the position information, direction information, and time information corresponds to an expected location of the target object; and notifying a user of the discrepancy.

* * * * *